Nov. 9, 1965  M. L. KRONENBERG  3,216,911
METHOD OF DETERMINING GAS CONCENTRATION AND
FUEL CELL CONSTRUCTION
Filed Sept. 29, 1961

INVENTOR.
MARVIN L. KRONENBERG

BY John R Doherty
ATTORNEY 3,216,911
METHOD OF DETERMINING GAS CONCENTRATION AND FUEL CELL CONSTRUCTION
Marvin L. Kronenberg, Warrensville Township, Ohio, assignor to Union Carbide Corporation, a corporation of New York
Filed Sept. 29, 1961, Ser. No. 141,774
11 Claims. (Cl. 204—1)

The invention relates to a fuel cell construction, and refers more particularly to a new and improved construction of a high temperature fuel cell.

A very important area of fuel cell development concerns those cells which operate at temperatures between about 450° C. and about 800° C. Such cells are commonly referred to as "high temperature fuel cells," and usually comprise a porous ceramic body with an electrolyte impregnated therein, fuel and oxidant catalysts on opposite sides of this body, and wire gauge on both these sides to collect the electric current produced when a fuel and an oxidant are properly introduced into the cell. Oxygen or air is usually the oxidant, and suitable fuels include hydrogen, propane, carbon monoxide, methane, and kerosene. The electrolyte usually consists of carbonates or hydroxides which are molten at temperatures between about 300° C. and 800° C.

One of the more important problems which have plagued these cells in the past is the prevention of electrolyte and gas leakage from the cell. At the temperature in question, gasketing materials rapidly deteriorate, especially since an oxidant is present, and cracks open up in joints between the parts which contain the basic cell since these parts and the basic cell have various rates of thermal expansion. Another important problem is concerned with the question of how to make a cell which has a small weight and volume and which is suitable for connection with other cells to form a battery which has a small weight and volume.

It is an object of the invention, therefore, to provide a fuel cell construction which minimizes weight and volume and which virtually eliminates any leakage from the cell.

Another object is to provide a fuel cell construction which is especially suitable for connection with other cells to form a battery requiring only a minimum of weight and space.

Another object is to provide a battery of fuel cells which minimizes weight and volume and which is substantially free of maintenance problems.

Broadly, the invention achieves the above objects by a fuel cell construction which comprises a tubular body of immobilized electrolyte, fuel and oxidant catalysts on opposite sides of the body, and current collection means on opposite sides of the body. Also included in the invention are modifications of this construction which are especially suitable for connection with one another to form batteries of fuel cells.

Figure 1:
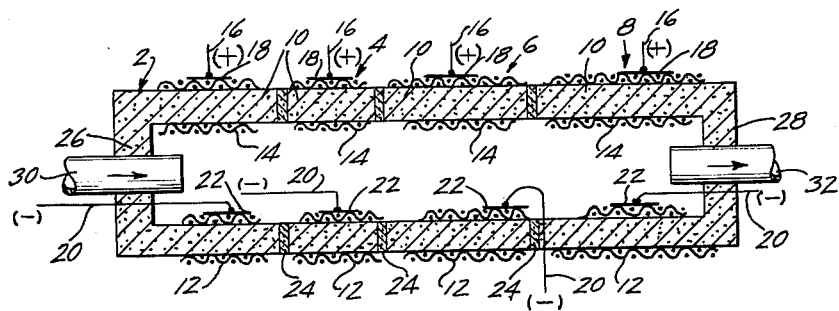
FIG. 1 is a sectional view of a battery made of the fuel cells of the invention and made in accordance with the invention.

Referring now to the drawing, and particularly to FIG. 1, the battery of fuel cells there shown is composed of four separate cells numbered 2, 4, 6 and 8, each of which comprises a substantially inert, porous, tubular matrix 10 suitably composed of a sintered ceramic material such as beryllia, magnesia, zirconia, or alumina. This matrix 10 should be porous enough to keep electrolyte resistance to a minimum and also should be substantially inert to the chemicals present. It has been found that matrices having pore diameters between 0.5 to 30 microns give the best cell performance and the longest cell life. This matrix 10 is impregnated with an electrolyte which melts at temperatures between about 300° C. and 800° C. A variety of carbonate or hydroxide electrolytes may be used, for example, and eutectic mixtures of these electrolytes are especially desirable.

Metal powders (not shown), which serve as catalysts, are uniformly placed on each side of the matrix 10. These powders are preferably "painted" on the matrix 10 in the form of a slurry with water as the carrier, or they may be placed on the matrix 10 by sintering or other suitable means. Suitable metal powders for promoting fuel oxidation include silver, nickel, mixtures of silver and nickel, iron, and mixtures of iron and silver. Silver powders are particularly suitable for promoting oxidant reduction, especially when air or oxygen is used as the oxidant, but other catalysts are known in the art.

The catalysts may be in other forms besides powders, such as screen and wire, and the invention is not considered as necessarily limited to metal powders as catalysts.

A positive current collector 12 is provided around the outside of each matrix 10, and is suitably composed of metal wire, screen, or perforated foil. Particularly suitable is a silver screen. Similarly a negative current collector 14 is provided around the inside of each matrix 10. These two current collectors press against their respective sides of the matrix 10 and help to hold the metal powders (catalysts) in place as well as collect the current produced. Positive lead wires 16 are connected to the positive current collectors 12 by means of metal tabs 18 attached to the collectors 12, and negative metal leads 20 are similarly attached to the negative collectors 14 by metal tabs 22.

The cells 2, 4, 6, and 8 are jointed together end to end by means of an insulating cement 24. This cement 24 should be strong enough to maintain a good joint, and should be substantially inert to the chemicals present at the temperatures in question. An alumina cement, for example, satisfies these requirements.

The outside ends of cells 2 and 8 are closed by caps 26 and 28 respectively. These caps are suitably provided by forming the matrix of each end cell in the shape of a cup. Electrolyte or other material impregnated in this part of the matrix prevents gas leaks. A separate plate of other suitable material, such as a metal can be cemented to the open ends of the tubular matrices to provide these caps if so desired.

A gas inlet conduit 30 extends through the plate 26, and a gas outlet conduit 32 extends through plate 28 to permit the passage of a fuel through the inside of the cells. Preferably, a cement is placed between the cap 26 and the conduit 30 to prevent leaks. Cement should also be used to seal around the conduit 32 to prevent leaks.

Figure 2:
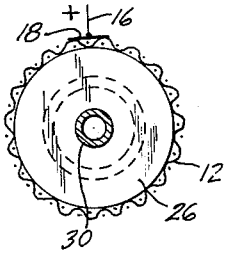
FIG. 2 is an end view of the battery shown in FIG. 1.

FIG. 2 is an end view of the above-described battery and further illustrates how the current collector 12 fits around the matrix 10 and how the lead wires 16 are attached to the collectors 12 by metal tabs 18.

The above-described battery is relatively light, and requires very little space. Such a battery construction has relatively few parts, eliminates troublesome gaskets, prevents leakage, and simplifies cell construction. Moreover, the number of places where critical tolerances are required is kept to a minimum. Also, the battery may be connected in series or parallel, or combinations of the two, to provide the voltages desired. The leads 20 can be brought out of the inside of the cells through the cement 24, the conduits 30 and 32, or through a hole drilled in the matrix 10. If a hole is drilled in the matrix, however, cement should be added to the hole after the lead is brought out to prevent gas leakage. Obviously, the positive and negative leads can be connected in various combinations.

A modification of the above-described battery which has been found to be very satisfactory has substantially the same construction as above, but the matrix is discontinuously catalyzed to form a plurality of cells instead of using an insulating cement to join several cells end to end. In all other respects, the same description as above applies. If a distance of at least about one centimeter is left between adjacent areas of catalysts, it was found that the battery will not short-circuit. Of course, an insulating cement may be impregnated into the matrix beween the areas of catalysts to prevent short circuits, if such troubles should arise.

Figure 3:
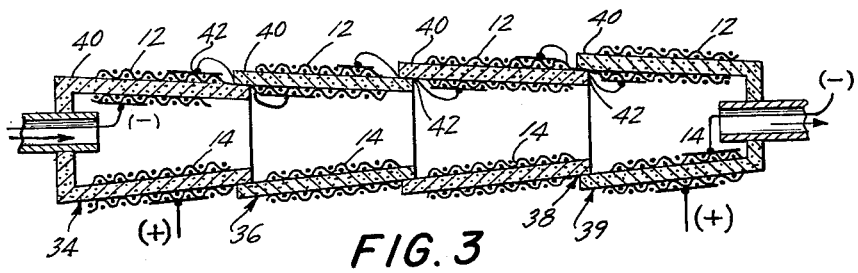
FIG. 3 is a sectional view of another battery of fuel cells made in accordance with the invention.

Another battery of fuel cells is shown in FIG. 3, and is comprises a plurality of cells 34, 36, 38, and 39 having a tapered tubular matrix 40. This matrix is tapered so that the smaller end of the matrix will fit into he larger end of the matrix of an adjacent cell. Such a battery can be easily connected in series by tabs 42 connecting the positive-collector 12 of each cell to the negative-collector 14 of the cell into which the first cell fits. Lead wires may be substituted for the tabs, or physical contact between the collector 12 of one cell and the collector 14 of the proper adjacent cell will also suffice as the electrical connection. All other aspects of this construction, including the individual cell construction, are the same as those shown in FIG. 1 and described above.

Figure 4:
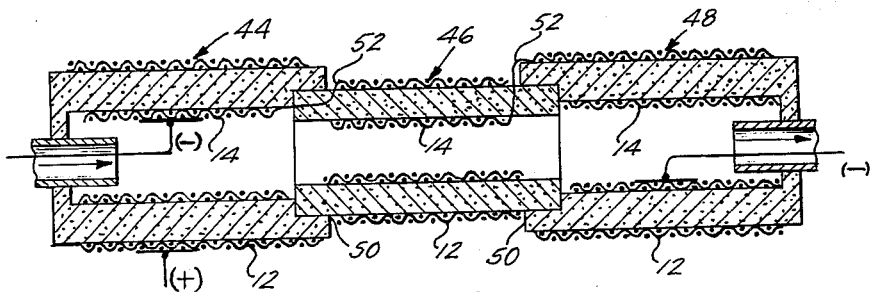
FIG. 4 is a sectional view of a third battery of fuel cells made in accordance with the invention.

Another construction of a battery of fuel cells is shown in FIG. 4, and it comprises a plurality of cells 44, 46, and 48. The construction of each of these cells is substantially the same as those shown in FIG. 1 and described above except that alternate cells have diameters of different sizes so that every other cell fits into both adjacent cells. The larger diameter cells may also have an enlargement of their inner diameters near their ends as shown at 50 in FIG. 4 to facilitate the fitting of the smaller diameter cell into the inside of the larger one. Leads 52 connect the outside collector 12 of each cell to the inside collector 14 of the adjacent cell in the same direction to form a series connection.

The following are specific examples of the above-described cells and batteries:

EXAMPLE I

A porous magnesium oxide tube was impregnated with a eutectic mixture of sodium and potassium hydroxide. Silver powder was deposited on both sides of the tube and silver screen was pressed against both sides. The anode and cathode area was about 60 square centimeters each. The cell was heated to 460° C., and hydrogen was introduced to the inside of the tube. Air surrounded the outside of the tube. Table I lists the operating data obtained.

*Table I*

| Voltage (resistance free): | Current (ma.) |
|---|---|
| 0.99 | O.C. |
| 0.99 | 100 |
| 0.99 | 200 |
| 0.99 | 300 |
| 0.98 | 400 |
| 0.98 | 500 |
| 0.97 | 600 |
| 0.95 | 700 |
| 0.94 | 800 |
| 0.92 | 1000 |
| 0.84 | 1500 |
| 0.74 | 2000 |
| 0.65 | 2500 |
| 0.60 | 2800 |

EXAMPLE II

A magnesium oxide tube having a pore diameter range from 0.5 to 8 microns was impregnated with a eutectic mixture of lithium, sodium, and potassium carbonates. A mixture of nickel and silver powders was deposited on the inside of the tube, and silver powder was deposited on the outside. Silver screens were placed on the inside and outside of the tube, and the cell was heated to 640° C. The anode and cathode area was approximately 30 square centimeters each. Table II tabulates the data obtained from this cell using hydrogen and the fuel and air as the oxidant.

*Table II*

| Voltage (Resistance Eliminate) (Volts) | Current (ma.) | Current Density (ma./cm.²) |
|---|---|---|
| 1.14 | Open circuit | Open circuit |
| 1.06 | 500 | 17 |
| 1.01 | 1,000 | 33 |
| 0.93 | 1,500 | 50 |
| 0.90 | 2,000 | 67 |
| 0.85 | 2,500 | 83 |
| 0.75 | 3,000 | 100 |

EXAMPLE III

A porous zirconia tube was impregnated with a eutectic mixture of lithium, sodium, and potassium carbonates. The tube was discontinuously catalyzed in three cylindrical sections of 25 cm.² each. An uncatalyzed cylindrical section of about one centimeter in length separated each two adjacent catalyzed areas. Nickel powder was used as a fuel oxidation catalyst on the inside of the tube, and silver powder as the oxidant reduction catalyst on the outside surfaces. Separate silver screens were placed against each area of catalysts, and the leads therefrom were connected in series. The cell was heated to 560° C., and hydrogen gas was introduced to the inside of the tube. Air with an addition of carbon dioxide was introduced to the outside of the tube. The data in Table III were obtained during operation.

*Table III*

| Voltage (resistance free): | Current (ma.) |
|---|---|
| 4.72 | O.C. |
| 4.00 | 1000 |
| 3.70 | 1500 |
| 3.58 | 2000 |
| 3.50 | 2500 |
| 3.35 | 3600 |

The particular construction of the invention has also been found to be particularly suitable as a gas analyzer. By using a known concentration of gas on one electrode, the concentration of gas on the other side can be established by the potential produced by the cell since the potential varies in accordance with the Nernst equation when a sintered silver electrode is used.

Such a gas analyzer is particularly effective for determining concentrations of oxygen and carbon dioxide, and can also be used to determine the concentration of gases which are inert to the cell by considering them as diluents of an oxygen-carbon dioxide mixture.

It should be apparent that the particular constructions of the invention provide a unique fuel cell which is especially suitable for connection with other cells to form batteries. Moreover, these constructions eliminate many of the maintenance problems associated with the prior art.

It will be apparent that many modifications and alterations are possible in the several constructions described herein as will be readily apparent to those skilled in the art. For example, it will be understood that the tubular body in the constructions may be composed of a solid electrolyte material rather than containing an immobilized electrolyte. Such a battery construction is normally operable in the vicinity of about 1000° C. or higher.

What is claimed is:

1. A battery of fuel cells for electrochemically reacting a fuel and an oxidant, said battery comprising a plurality of unit cells, each of said unit cells comprising a substantially tubular body of solid electrolyte; a catalyst for promoting fuel oxidation on one side of said body; a catalyst for promoting oxidant reduction on the other side of said body; outside current collection means on the outside of said body; and inside current collection means on the inside of said body; said unit cells being joined end to end to form a single continuous tubular conduit running through said plurality of unit cells; electrical insulating means separating adjacent unit cells; and said outside current collection means of each cell being electrically connected to said inside current collection means of each adjacent cell in the same direction.

2. A battery of fuel cells for electrochemically reacting a fuel and an oxidant, said battery comprising a plurality of unit cells, each of said unit cells comprising a substantially tubular matrix impregnated with an electrolyte; a catalyst selected from the group consisting of silver, nickel, iron, and mixtures thereof for promoting fuel oxidation on one side of said matrix; a silver catalyst for promoting oxidant reduction on the other side of said matrix; outside current collection means on the outside of said matrix; and inside current collection means on the inside of said matrix; said unit cells being joined end to end to form a single continuous tubular conduit running through said plurality of unit cells; electrical insulating means separating adjacent unit cells; and said outside current collection means of each cell being electrically connected to said inside current collection means of each adjacent cell in the same direction.

3. A battery of fuel cells for electrochemically reacting a fuel and an oxidant, said battery comprising a plurality of unit cells, each of said unit cells comprising a substantially tubular body of immobilized electrolyte; a catalyst for promoting fuel oxidation on one side of said body; a catalyst for promoting oxidant reduction on the other side of said body; current collection means on the outside of said body; and current collection means on the inside of said body; said unit cells being disposed end to end and the end of one of each adjacent pair of cells being fitted into the end of the other cell of each adjacent pair; electrical insulating means separating adjacent unit cells; and said outside current collection means of each cell being electrically connected to said inside current collection means of each adjacent cell in the same direction.

4. The battery defined in claim 3 wherein said body of immobilized electrolyte comprises a substantially inert, porous matrix and an electrolyte impregnated therein.

5. A battery of fuel cells for electrochemically reacting a fuel and an oxidant, said battery comprising a plurality of unit cells, each of said unit cells comprising a substantially tubular matrix body impregnated with an electrolyte, said tubular body being tapered so that the outside diameter at the smaller end will fit into the inside diameter at the larger end; a catalyst for promoting fuel oxidation on one side of said body; a catalyst for promoting oxidant reduction on the other side of said body; current collection means on the outside of said body; and current collection means on the inside of said body; said unit cells being uniformly disposed end to end and said smaller end of each cell being fitted into said larger end of an adjacent cell; electrical insulating means separating adjacent unit cells; and said outside current collection means of each cell being electrically connected to said inside current collection means of the next adjacent cell.

6. The battery defined in claim 5 wherein a lead wire electrically connects said outside current collection means of each cell to said inside current collection means of the next adjacent cell.

7. The battery defined in claim 5 wherein said outside current collection means of each cell fits against said inside current collection means of the next adjacent cell.

8. A battery of fuel cells comprising a plurality of unit cells, each of said unit cells comprising a substantially tubular matrix body impregnated with an electrolyte; a catalyst for promoting fuel oxidation on one side of said body; a catalyst for promoting oxidant reduction on the other side of said body; current collection means on the outside of said body; and current collection means on the inside of said body; said unit cells being disposed end to end and alternately having different diameters so that the outside diameter of every other cell fits into the inside diameter of adjacent cells; electrical insulating means separating adjacent unit cells; and said outside current collection means of each cell being electrically connected to said inside current collection means of each adjacent cell in the same direction.

9. The battery defined in claim 8 wherein a lead wire electrically connects said outside current collection means of each cell to said inside current collection means of each adjacent cell in the same direction.

10. A battery of fuel cells comprising a plurality of unit cells, said battery comprising a substantially tubular matrix body impregnated with an electrolyte; a fuel oxidation catalyst discontinuously on one side of said body so that distinct cylindrical areas of catalyst are separated by an uncatalyzed cylindrical section at least about one centimeter in length; an oxidant reduction catalyst discontinuously on the other side of said body in areas directly opposite said fuel oxidation catalyst; and separate current collection means disposed against each of said area of said fuel oxidation catalyst and of said oxidant reduction catalyst.

11. A method for determining gas concentrations in mixtures of oxygen and carbon dioxide, which method comprises the steps of (A) simultaneously (1) contacting a first mixture of oxygen and carbon dioxide of known concentration with a silver powder catalyst on one side of a substantially inert, porous matrix impregnated with a carbonate electrolyte, (2) contacting a second mixture of oxygen and carbon dioxide of unknown concentration with a silver powder catalyst on the other side of said matrix, and (3) measuring the electrical potential produced between said catalysts; and (B) ascertaining the concentration of the unknown mixture from said potential and said known concentration by using the Nernst equation.

References Cited by the Examiner

UNITED STATES PATENTS

| | | | |
|---|---|---|---|
| 913,390 | 2/09 | Junger | 136—86 |
| 2,175,523 | 10/39 | Greger. | |
| 2,830,109 | 4/58 | Justi et al. | 136—86 |
| 2,894,053 | 7/59 | Lonzos | 136—87 |
| 2,914,596 | 11/59 | Gorin et al. | 136—86 |
| 2,938,064 | 5/60 | Kordesch | 136—86 |
| 2,980,749 | 4/61 | Broers | 136—120 |
| 3,138,488 | 6/64 | Tragert | 136—86 |

JOHN H. MACK, *Primary Examiner.*

JOHN R. SPECK, *Examiner.*